US006823365B1

(12) United States Patent
Mattis et al.

(10) Patent No.: US 6,823,365 B1
(45) Date of Patent: Nov. 23, 2004

(54) METHOD AND APPARATUS FOR REDIRECTION OF DATA WHEN ELECTRONIC MAIL IS RESTRICTED

(75) Inventors: Steve Mattis, Boise, ID (US); John Hall, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 09/638,459

(22) Filed: Aug. 14, 2000

(51) Int. Cl.[7] ............................................... G06F 15/16
(52) U.S. Cl. ...................... 709/206; 709/219; 709/226; 709/238
(58) Field of Search ................................ 709/206, 217, 709/219, 223, 226, 238, 207, 225, 313

(56) References Cited

U.S. PATENT DOCUMENTS

| 5,903,723 | A | * | 5/1999 | Beck et al. ................ 709/206 |
| 6,134,582 | A | * | 10/2000 | Kennedy .................... 709/206 |
| 6,249,808 | B1 | * | 6/2001 | Seshadri ..................... 709/206 |
| 6,275,850 | B1 | * | 8/2001 | Beyda et al. ................ 709/206 |
| 6,282,565 | B1 | * | 8/2001 | Shaw et al. ................. 709/206 |
| 6,430,177 | B1 | * | 8/2002 | Luzeski et al. ............. 370/356 |
| 6,477,243 | B1 | * | 11/2002 | Choksi et al. .......... 379/100.06 |
| 6,505,236 | B1 | * | 1/2003 | Pollack ....................... 709/206 |
| 6,542,584 | B1 | * | 4/2003 | Sherwood et al. ....... 379/88.18 |
| 6,687,743 | B1 | * | 2/2004 | Innes .......................... 709/206 |

FOREIGN PATENT DOCUMENTS

| EP | 0887995 | 12/1998 |
| EP | 1164757 | 12/2001 |
| JP | 11-205375 | 7/1999 |
| JP | 11-331204 | 11/1999 |
| WO | WO98/03928 | 1/1998 |

* cited by examiner

Primary Examiner—Viet D. Vu

(57) ABSTRACT

A method and apparatus for determining if a data set for transmission can be set directly via e-mail, given predetermined thresholds for sending, or whether it is more expedient to reroute the data set to a web site. Every time a user sends document to e-mail, transparently the size of the document and job is compared to the thresholds and the system automatically determines the best available routing, reformatting if necessary.

20 Claims, 9 Drawing Sheets

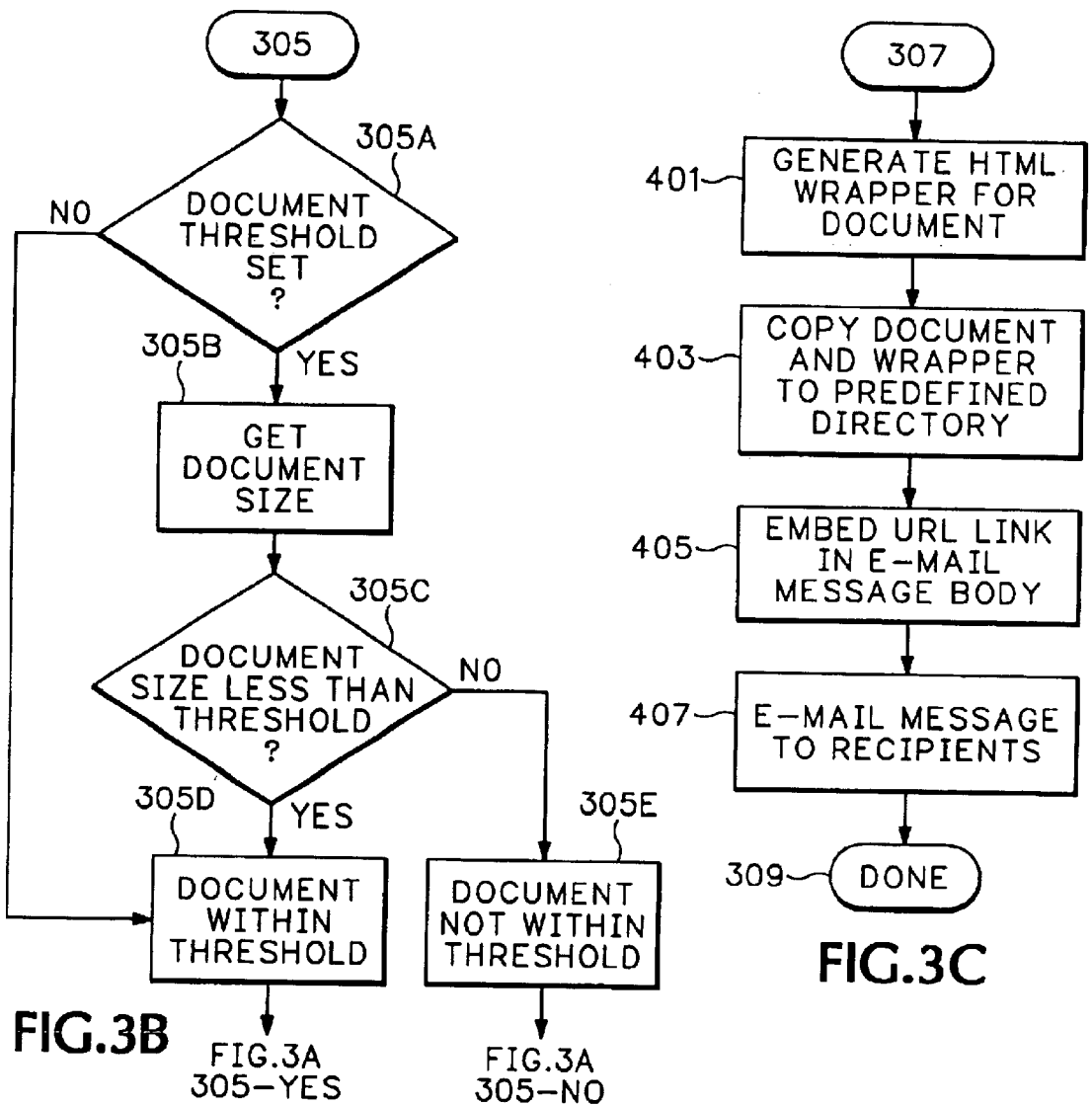

METHOD AND APPARATUS FOR REDIRECTION OF DATA WHEN ELECTRONIC MAIL IS RESTRICTED

FIELD OF THE INVENTION

The present invention relates generally to computer networks, more specifically to internet data communications, and particulary to the automatic redirection of a digital send to a web page when sending through electronic mail channels becomes restricted.

BACKGROUND OF THE INVENTION

Glossary

The following terms and acronyms are used throughout this document; these definitions are provided for the convenience of the reader; however, no limitation on the scope of the invention should be implied herefrom.

"Client-Server": A model of interaction in a distributed computer network system in which a program at one site sends a request to another site and then waits for a response. The requesting program is called the "client," and the program which responds to the request is called the "server." In the context of the World Wide Web ("www" or "web;" defined hereinafter), the client is a "browser;" a program which runs on a computer of an end-user. A program and network computer which responds to a browser request by serving web pages and the like, are referred to as a "server." Specialized servers, such as dedicated electronic mail (defined hereinafter) servers are also known in the art.

"Electronic Mail" ("e-mail"): The process and software for sending and receiving of textual information and attachments thereto between end-users over a distributed computer network such as the internet; internet access providers often include e-mail service to its customers as part of the access software that allows the end user to dial into the internet.

"Hyperlink": An internet navigational link from one document or web page to another, or from one portion or component of a document or web page to another. Typically, a hyperlink is displayed as a high-lighted word or phrase on a web page that can be selected by clicking a mouse screen pointer thereon, resulting in an automatic transfer to the associated document or portion.

"Hypertext System": A computer-based informational system in which documents or other types of data, are linked together via hyperlinks to form a user-navigable web of network or internet sites.

"Internet": A generic term for a collection of distributed, interconnected networks (ARPANET, DARPANET, World Wide Web, or the like) that are linked together by a set of industry standard protocols (e.g., TCP/IP, HTTP (defined hereinafter), and the like) to form a global, distributed network.

"Header": A data string defining the attributes such as size, data format, and the like, of an attached message.

"Hypertext Mark-up Language" ("HTML"): A standard coding convention and set of codes for attaching presentation and linking attributes to informational content within documents; the primary standard used for generating web documents. During a document authoring stage, the HTML codes (referred to as "tags") are embedded within the informational content of the document; when the document is subsequently transferred from a server to a client, the codes are interpreted by the browser and used to parse and display the document. In specifying how the browser is to display the document, HTML tags can be used to create hyperlinks to other web documents.

"HyperText Transport Protocol" ("HTTP"): The standard www client-server protocol used for the exchange of information such as HTML documents and client requests for such documents between a browser and the server. HTTP includes a number of different types of messages which can be sent from the client to the server to request different types of server actions. For example, a "get" message which has the format GET<URL> (defined hereinafter) causes the server to return the document or file located at the specified URL.

"PULL": A technology, commonly used as the basis for web communications, in which the client browser must request a specific web page, such as by a hyperlink, before it is sent by a server.

"PUSH": A technology for information dissemination used by a server to send data to users over a network. PUSH protocols send the informational content to the end user computer, or client, automatically, typically based on information pre-specified by the user.

"Uniform Resource Locator" ("URL"): A unique address which fully specifies the location of a file or other resource on the internet. The general format of a URL is "protocol://machine address:port/path/filename." The port specification is optional, and if none is entered by the user, the browser defaults to the standard port for whatever service is specified as the protocol. For example, if HTTP is specified as the protocol, the browser will use the HTTP default port; <HTTP://WWW.HP.COM> is a URL, where postfix ".COM" is a commercial entity, ".EDU" is an educational entity, ".GOV" is a government entity, and ".ORG" is a non-profit organization. Hyperlinks are often URL designations.

"Simple Mail Transfer Protocol" ("SMTP"): A standard protocol which provides the mechanism for sending e-mail messages; an electronic mail Server can use SMTP to forward messages.

"Web Site": A computer system that serves informational content over a network using the standard protocols of the web. Typically, a web site corresponds to a particular internet domain name, such as HP.COM", and includes the content associated with a particular organization such as Hewlett-Packard Company. The term is generally intended to encompass both (1) the hardware/software server components that serve the informational content over the network, and (2) the "back-end" hardware-software components, including any non-standard or specialized components that interact with the server component to perform service for web site users.

"World Wide Web ("web")": Refers generally to both (1) a distributed collection of interlinked, user-viewable hypertext documents ("web documents" or "web pages") that are accessible via the internet, and (2) the client and server software components which provide user access to such documents using standardized internet protocols. Currently, the primary standard protocol for allowing applications to locate and acquire web documents is HTTP, and the web pages are encoded using HTML. However, the terms "web" and "world wide web" as used herein are intended to encompass future mark-up languages and transport protocols which may be used.

DESCRIPTION OF RELATED ART

The inter-computer communications system known as the internet and world wide web have become a ubiquitous reality more quickly than most previous technology innovations.

E-mail products, e.g., Microsoft™ Exchange Server 5.5 software, run on dedicated mail servers, e.g., the HP™ E60 NetServer computer, are commercially available. In order to control e-mail traffic, many e-mail servers limit the size of e-mail text "messages" or messages and attachments in the form of digital files that can be sent intact, making it problematic to send via e-mail very "large documents" (i.e., an entire informational content data set including text messages, attachments, and the like). Generally in the state of the art a system administrator will set a specified limit for the data set file size about one megabyte as a threshold for allowing unrestricted e-mail transmission. A document is limited to the smallest unit encountered or the message is partitioned. (Hereinafter, the term "LARGE DOCUMENT" is used to mean any message or document which exceeds an e-mail server specified content limit; no limitation on the scope of the invention is intended nor should any be implied from other uses or conventions for this term.)

Image content files, such as photographs, are often much larger than such a specified limit, thus constituting a LARGE DOCUMENT. Similarly, color documents have embedded code for specifying each picture element ("pixel"), in other words, more data per pixel, and thus greatly increase a document data set complete file size. When a server encounters a message having a header indicating that the message or the message and its attachments exceeds the specified limit, the document is either broken into smaller messages or rejected, issuing an error report. Either action results in a substantial transmission delay for the sender and often frustration for the recipient trying to download the files. At the same time, e-mail, including the process of attaching and sending other files such as photographs with the e-mail text, is a popular, simple communication tool.

Similarly problematical, when e-mail messages are addressed by the client to many recipients on different systems simultaneously, e-mail servers create multiple copies of the document and then separately distribute the copies. This is a memory, disk space, intensive procedure, also delaying distribution. Morever, the latest office tool is the "digital sender," a module that can be used with a document scanning apparatus having an automatic document feeder ("ADF") associated therewith or a hard copy printing apparatus. The HP™ model 8100C or 9100C digital sender apparatus can be employed with a multifunctional computer peripheral ("MFP"), such as the HP™ model C7819A digital sender appliance for an LaserJet™ MFP which includes a laser printer, scanner-copier, and the digital sender, thus having the capability to transmit copies of LARGE DOCUMENTS to a plurality of clients simultaneously, to another LAN (via a network server), to computers, to a fax machine, or the client receivers sitting on the LAN. The digital sender includes options to transfer the copies via facsimile transmission or via e-mail by providing a control panel employing an e-mail addressing user interface.

FIG. 1 (Prior Art) is a drawing of the HP Digital sender. From the end user's point of view, operation is similar to a facsimile machine transmission; from an information technology ("IT") standpoint, administration may be more complex as the data content is sent over a digital network such as a local area network ("LAN"), wide area network ("WAN"), or the like.

FIGS. 1B–1F (Prior Art) show details of the LCD user control panel. An importable, programmable address book feature allows for simultaneous distribution to every addressee in the book.

Thus, either sending LARGE DOCUMENTs or sending documents to many recipients may overly tax the capability of an e-mail server.

One prior solution is to have the digital sending device always break image documents apart at physical or logical page boundaries. This is slow and inconvenient for the end-users. An even less acceptable solution is for the sender himself or herself to break the document into multiple send jobs before trying to transmit.

There is a need for an automatic, user-transparent solution to the problem of sending large data files when the end user is using an e-mail program.

SUMMARY OF THE INVENTION

In a basic aspect, the present invention provides process for transmitting a data set over a computer network, including the steps of: predetermining a data set size threshold; determining a data set size; and if said data set size is less than said threshold, transmitting via electronic mail, or if said data set size is greater than said threshold, transmitting to a data storage site.

In another aspect, the present invention provides a system for transmitting data sets over a network including: at least one digital sender coupled to the network, having a plurality of computing devices thereon, said computing devices each having electronic mail and computer network navigation tools; and mechanisms for routing data sets over the network, including mechanisms for determining size of a data set to be routed to a predetermined electronic mail destination, mechanisms for comparing a determined data set size to a threshold, mechanisms for rerouting the data set from electronic mail to a data storage site when said determined data set size is greater than said threshold, and mechanisms for substituting an electronic mail message, including a link to the data site, to the predetermined electronic mail destination when said determined data set size is greater than said threshold.

In another aspect, the present invention provides a multifunctional peripheral apparatus for a computer network, including: a document digitizing subsystem; connected to the document digitizing device, a sending module for transmitting a data set created with the document digitizing device; and associated with the sending module, a routing subsystem for determining if a data set is to be transmitted via electronic mail or via a data storage unit.

In yet another aspect, the present invention provides a computer memory including: a program for routing data sets over a computer networking, including computer readable coded instructions for predetermining a data set size threshold; computer readable coded instructions for determining a data set size; and if said data set size is less than said threshold, computer readable coded instructions for transmitting via electronic mail, or if said data set size is greater than said threshold, computer readable coded instructions transmitting via a data storage site.

Some of the advantages of the present invention are:

it provides an e-mail user with system behavior exactly as expected when sending typical e-mail messages;

it provides transparent, automatic, system alteration when a LARGE DOCUMENT exceeds server specified data file size limits for e-mail handling;

it provides a methodology by which a recipient always receives a LARGE DOCUMENT intact;

the average cost of sending a LARGE DOCUMENT could be significantly reduced by not sending the largest or most widely distributed document through a plurality of e-mail servers;

it provides the recipient with a choice for downloading a LARGE DOCUMENT;

remote end-user recipients can access web located LARGE DOCUMENTs with any browser and eliminate having to download from their e-mail provider; and environments commonly using complex, LARGE DOCUMENTs are provided with simpler operations and greater confidence in digital sending.

The foregoing summary and list of advantages is not intended by the inventors to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

DESCRIPTION OF THE DRAWINGS

FIGS. 3A through 3D are a flow chart of the process in accordance with the present invention.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable.

Figure 1:
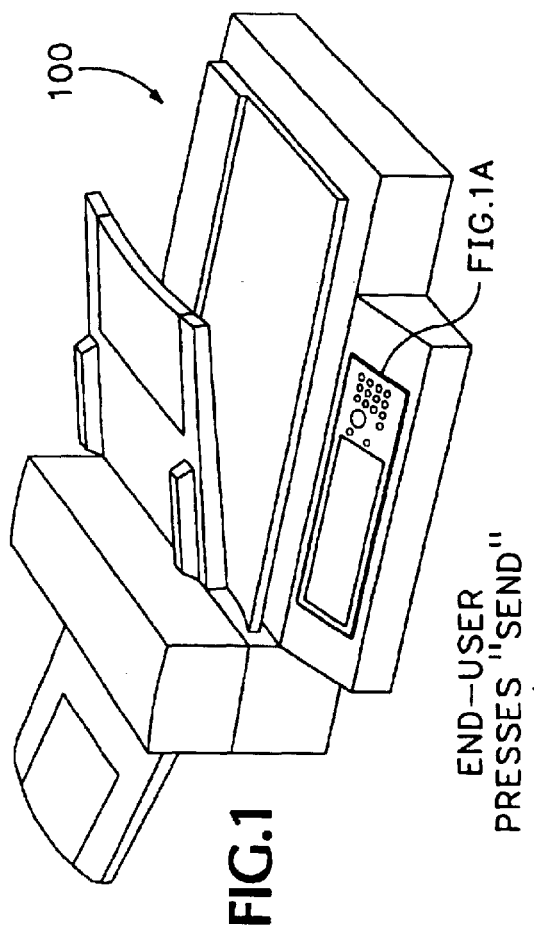
FIG. 1 (Prior Art) is a perspective view of a digital sender module.
Figure 1A:
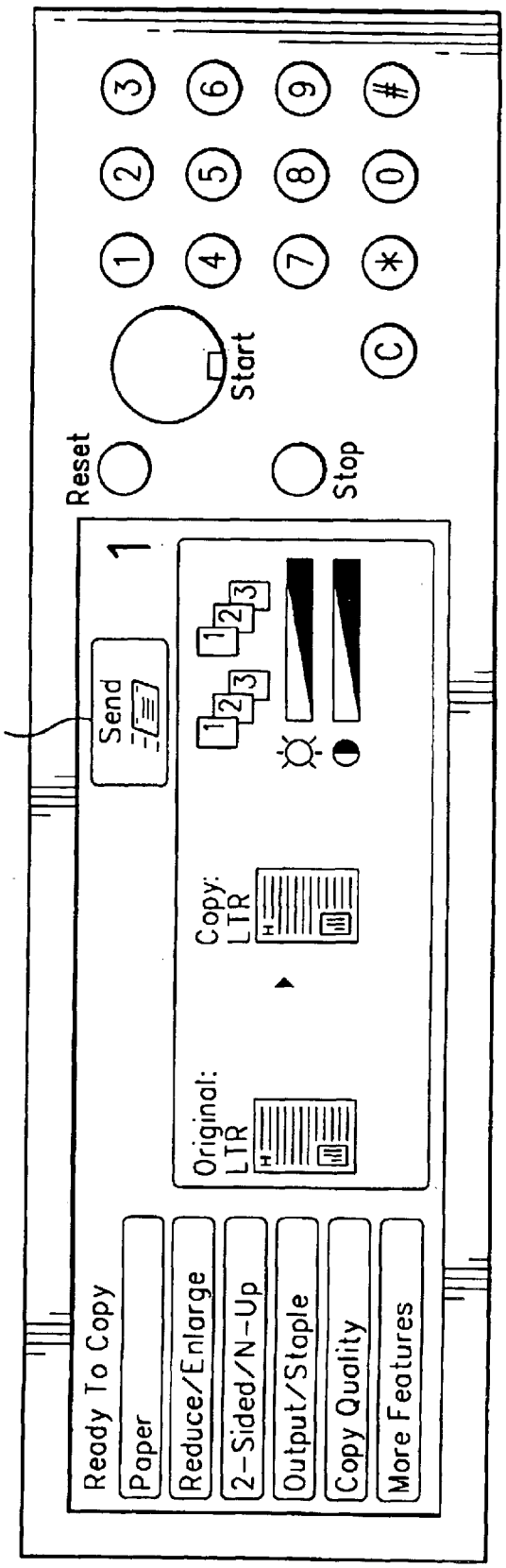
FIGS. 1A–1F are detail illustrations of exemplary control panels for the digital sender module as shown in FIG. 1.
Figure 1B:
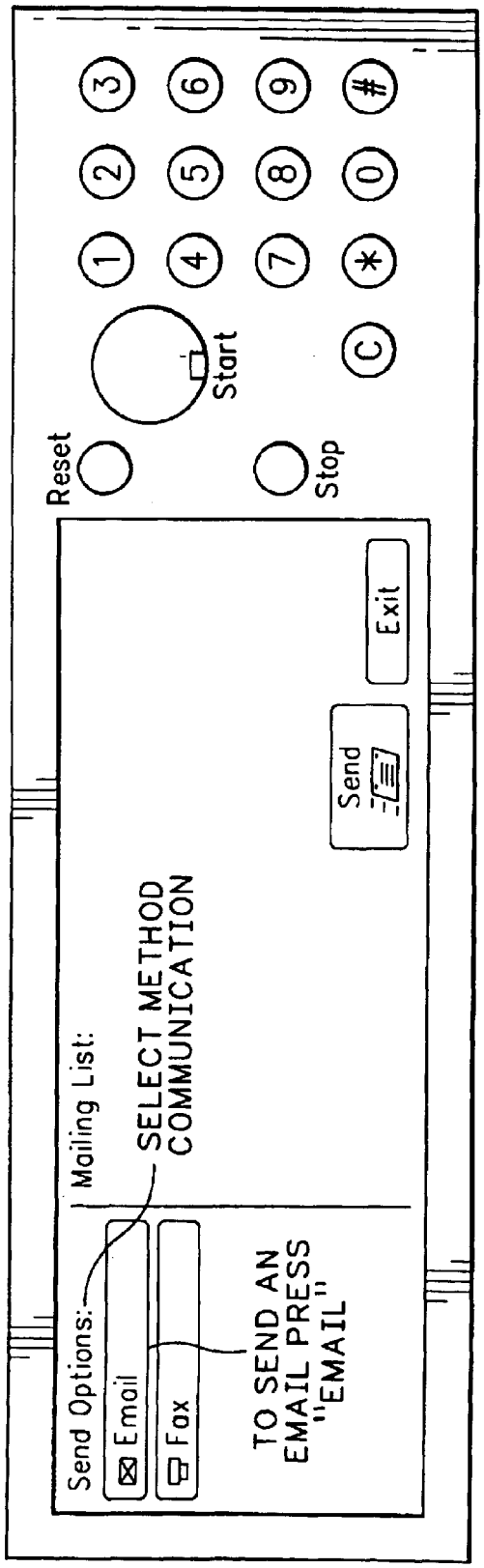
Figure 1C:
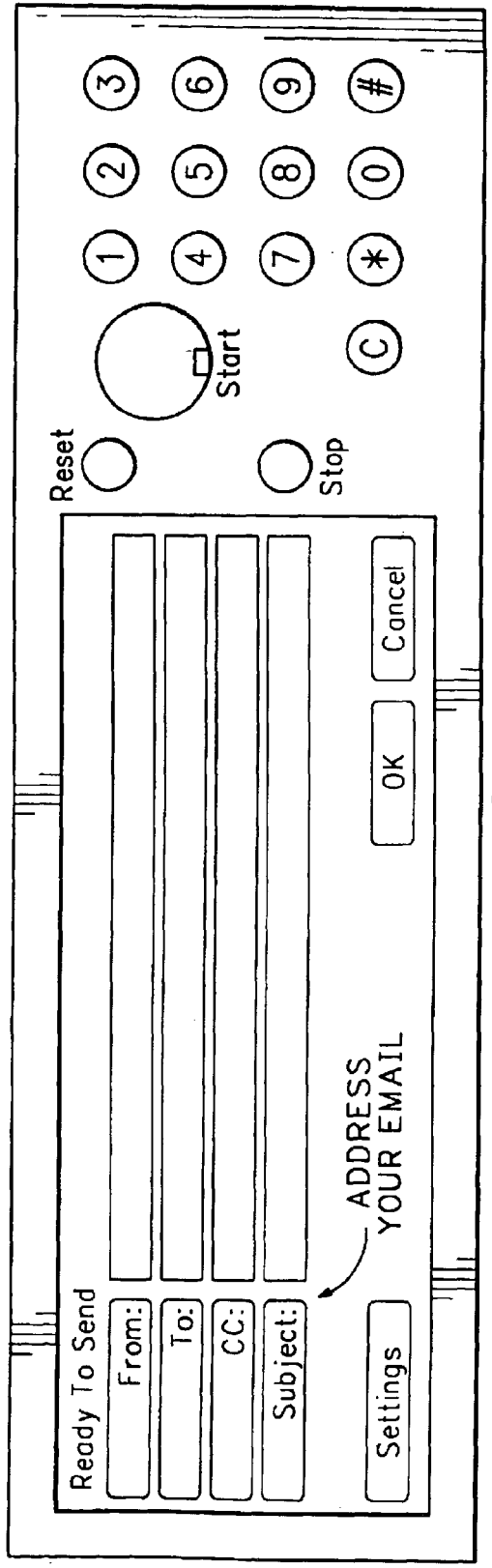
Figure 1D:
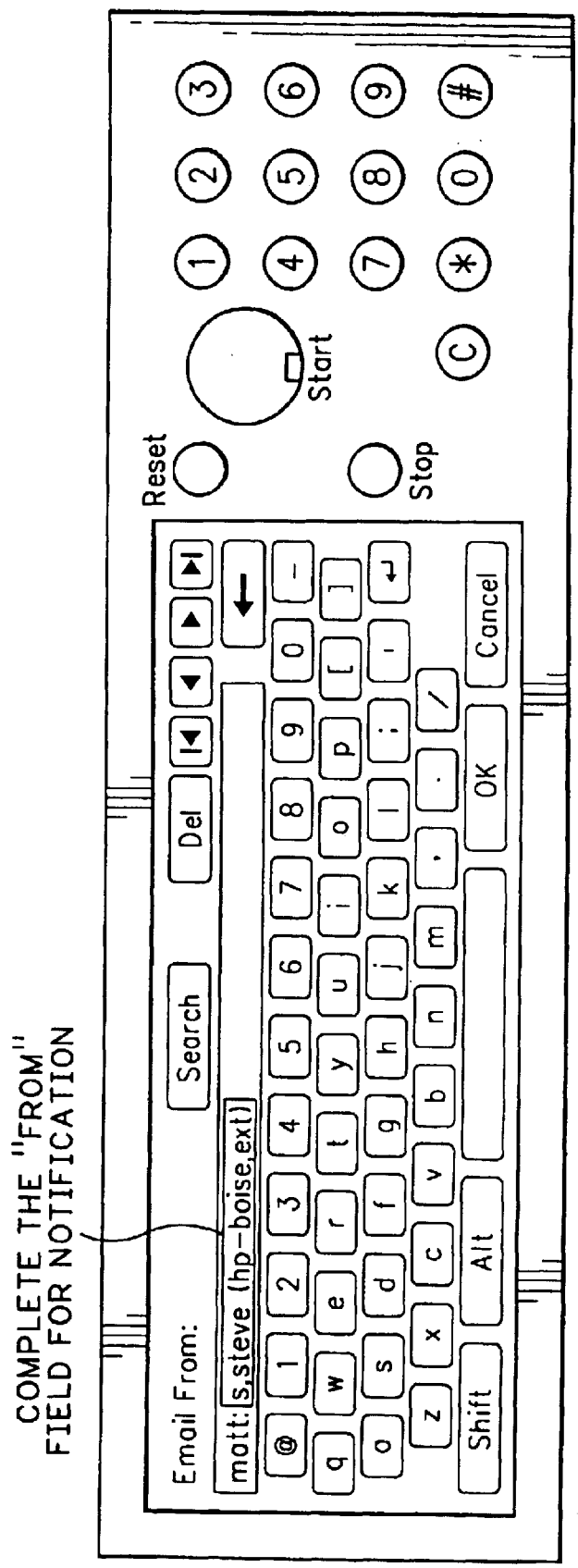
Figure 1E:
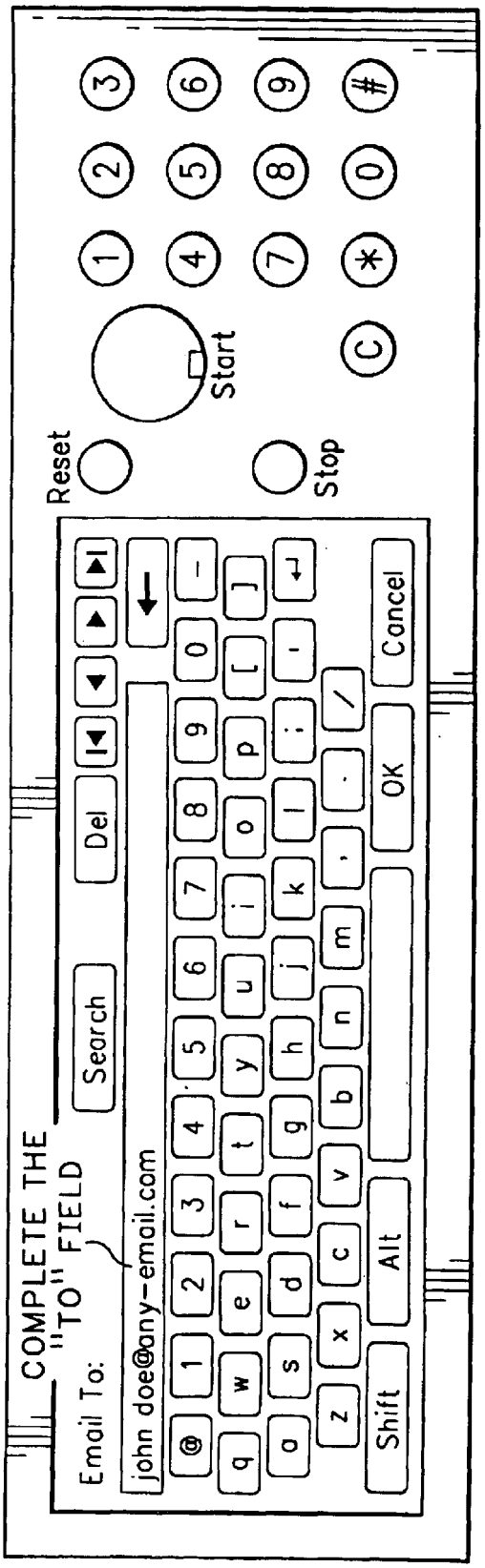
Figure 1F:
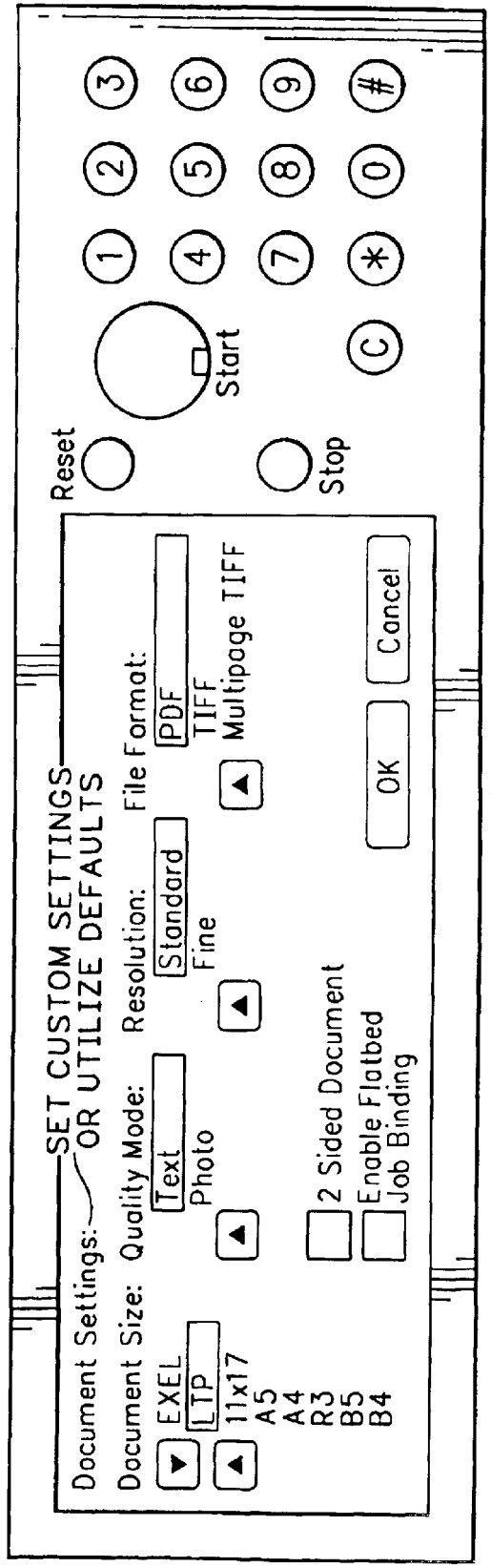
Figure 2:
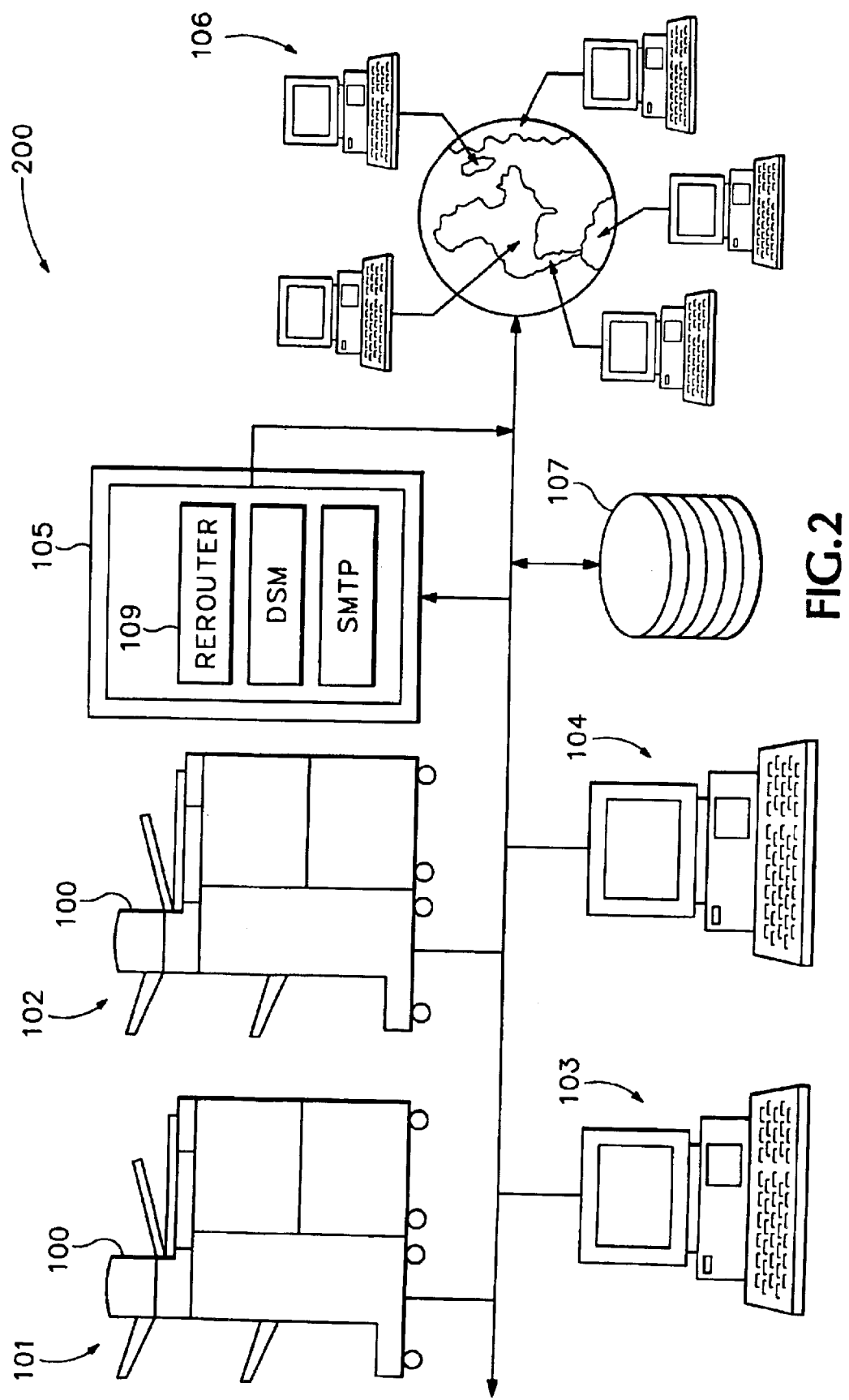
FIG. 2 is a schematic drawing of an exemplary network system in accordance with the present invention.

Referring to FIG. 2—an exemplary network implementation—a client or plurality of client stations is on LAN, represented by the line labeled "TCP/IP Network" which includes a plurality of MFP's 101, 102 including digital sender 100 units, and a plurality of workstations 103, 104, and at least one server 105. An e-mail software module for the SMTP standard is shown on the server 105; note that other internet e-mail standards as may be adopted can be employed. The server 105 for this example also includes digital sender software (digital sender module or "DSM") shown as a box labeled "DSM" and other programs for running the TCP/IP Network communications. For this exemplary embodiment, the programmed process in accordance with the present invention is shown as a box labeled "REROUTER" 109. It should also be noted that in the alternative, the digital sender as a standalone apparatus 101, 102 could serve as a network server in and of itself and employ the process of the present invention; and, each workstation 103, 104 can in fact be a personal computer with the appropriate e-mail software on its hard drive. The TCP/IP Network is coupled to the public internet or world wide web shown as element 106 and simply referred to hereinafter as "the internet 106" or "the web 106."

Figure 3A:
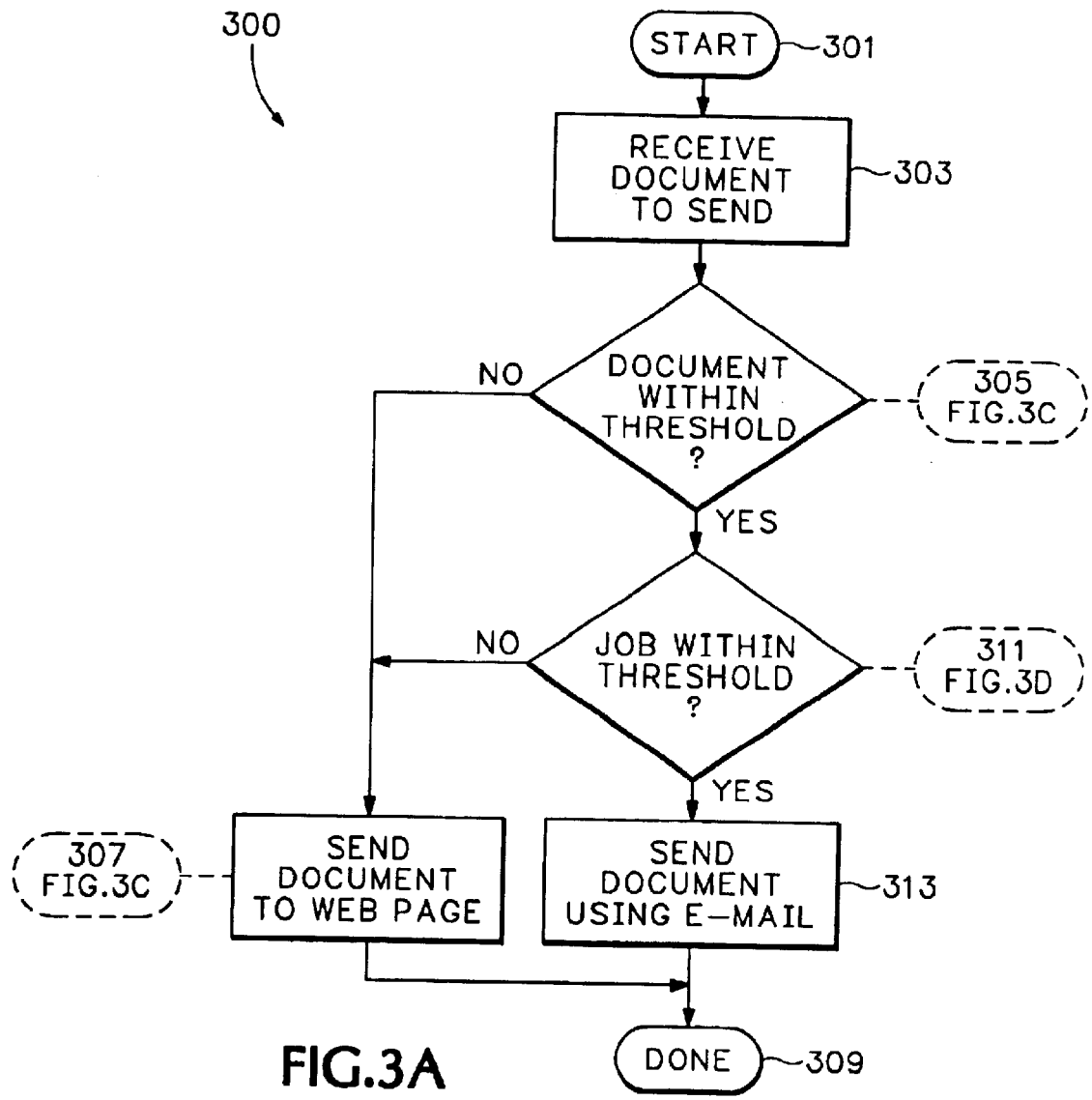

The REROUTER module 109 process in accordance with the present invention is shown in FIGS. 3A–3D. The REROUTER module 109 can be implemented as computer readable, digital code instructions. FIG. 3A is the basic methodology for the process 300, added to the e-mail process on-board the server 105 or, if so configured, on-board the MFP-based DSM itself. The Digital sender 100 starts the data flow, step 301, receiving and formatting a data set, or document, to be transmitted, step 303. The DSM REROUTER module ("DSMR") 109 is supplied by the system administrator with the knowledge of a predetermined threshold, e.g., 2-Mbytes, for the net server 105 transmitting a document intact as a regular, single, e-mail transmission. The DSMR 109 tests the document to determine if it is a LARGE DOCUMENT, step 305; further detail of step 305 decision as to whether the document is greater than the threshold, constituting a "LARGE DOCUMENT," is shown in FIG. 3B, via any known manner decision algorithm. Effectively, the system administrator can set a document threshold, e.g. 1-Mbyte. If such a threshold in fact is set, step 305A, YES-PATH, then the actual size of the next document to be sent is determined, step 305B, and compared to the threshold, step 305C, and the decision routed accordingly, steps 305D or 305E.

Assume for the moment that the document is a LARGE DOCUMENT, viz., greater than the system administrator's predetermined threshold for e-mail documents, step 305-NO path. Since the LARGE DOCUMENT can not be sent intact over the threshold restricted e-mail channel, the DSMR reformats certain content of the LARGE DOCUMENT and reroutes it, step 307. Further detail of step 307 is shown in FIG. 3C. In accordance with the present invention, the LARGE DOCUMENT is directed to a web site for temporary storage intact. Thus, in order to do so, the DSMR 109 now must make the LARGE DOCUMENT and make it compatible with web sites which, as noted in the Background section above, use different protocols for formatting and locating information data set.

First, the LARGE DOCUMENT is provided with HTML coding, attaching presentation and linking attributes to informational content within the LARGE DOCUMENT, step 401. This is known as providing an HTML "Wrapper."

Next, step 403, the LARGE DOCUMENT and its Wrapper are copied to a predetermined directory, namely, a web site. The web site can be any manner of virtual courier service, e.g., United Parcel Service's commercially available web site at http://www.ups.com, or a virtual document escrow service, or virtual document storage site set up by the sending or receiving LAN themselves, or the like as would be known in the state of the art, represented in FIG. 2 simply as on-line storage 107.

Next, step 405, the DSMR 109 embeds a URL in an e-mail message which is substituted for the LARGE DOCUMENT.

Figure 4:
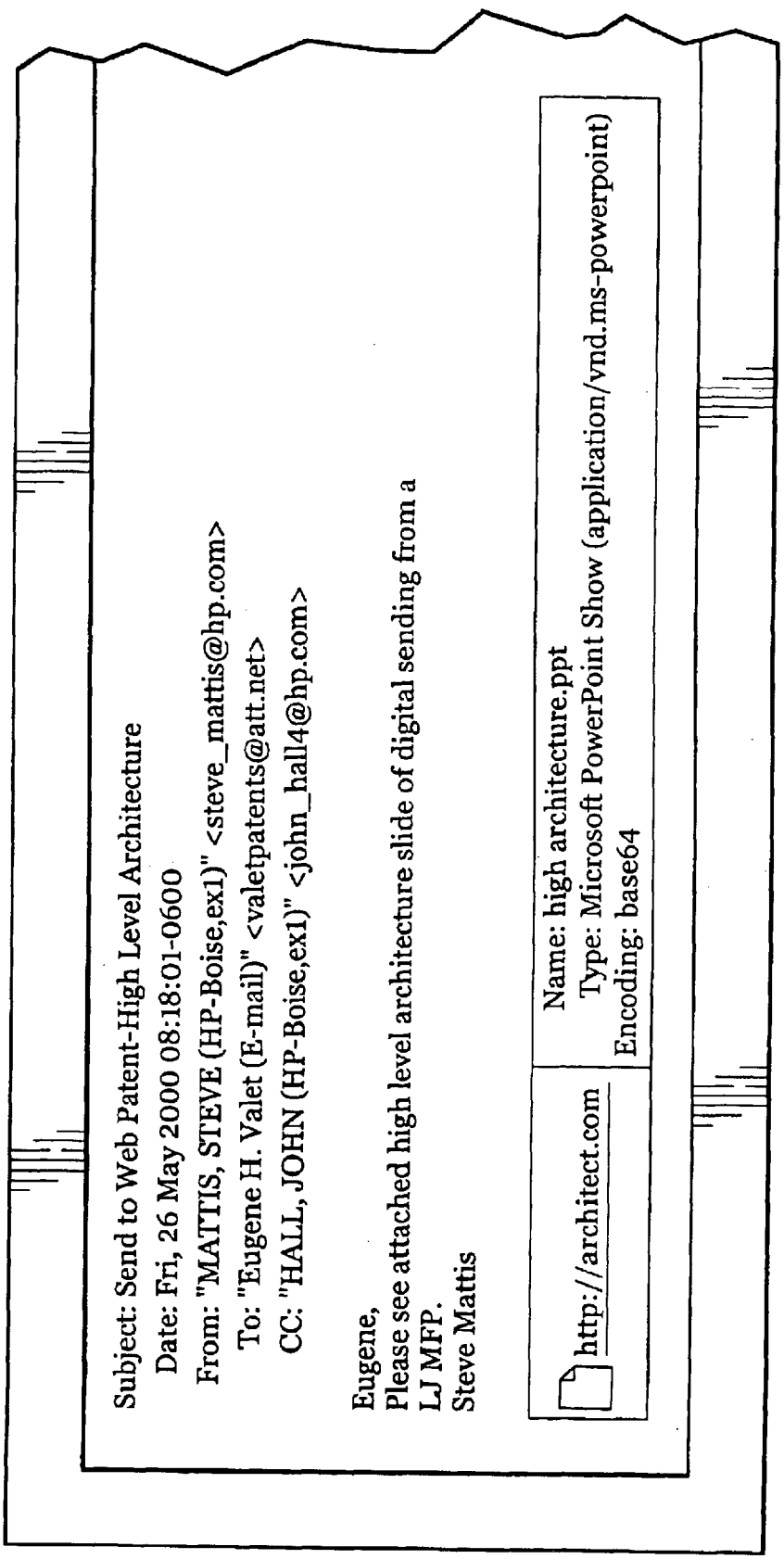
FIG. 4 is an exemplary e-mail message generated during the process as shown in FIGS. 3A and 3C.

Next, step 407, the e-mail message is sent to all intended recipients. An exemplary e-mail message as might be received by each recipient is shown in FIG. 4. In this example, the URL is "http://architect.com." Clicking on the URL will cause the recipient's workstation to transfer to the web site and, assuming the recipient has Microsoft™ PowerPoint Show™ software, the LARGE DOCUMENT will open automatically or upon command selected from the browser program. The DSMR process for this LARGE DOCUMENT is essentially done, step 309.

Figure 3D:
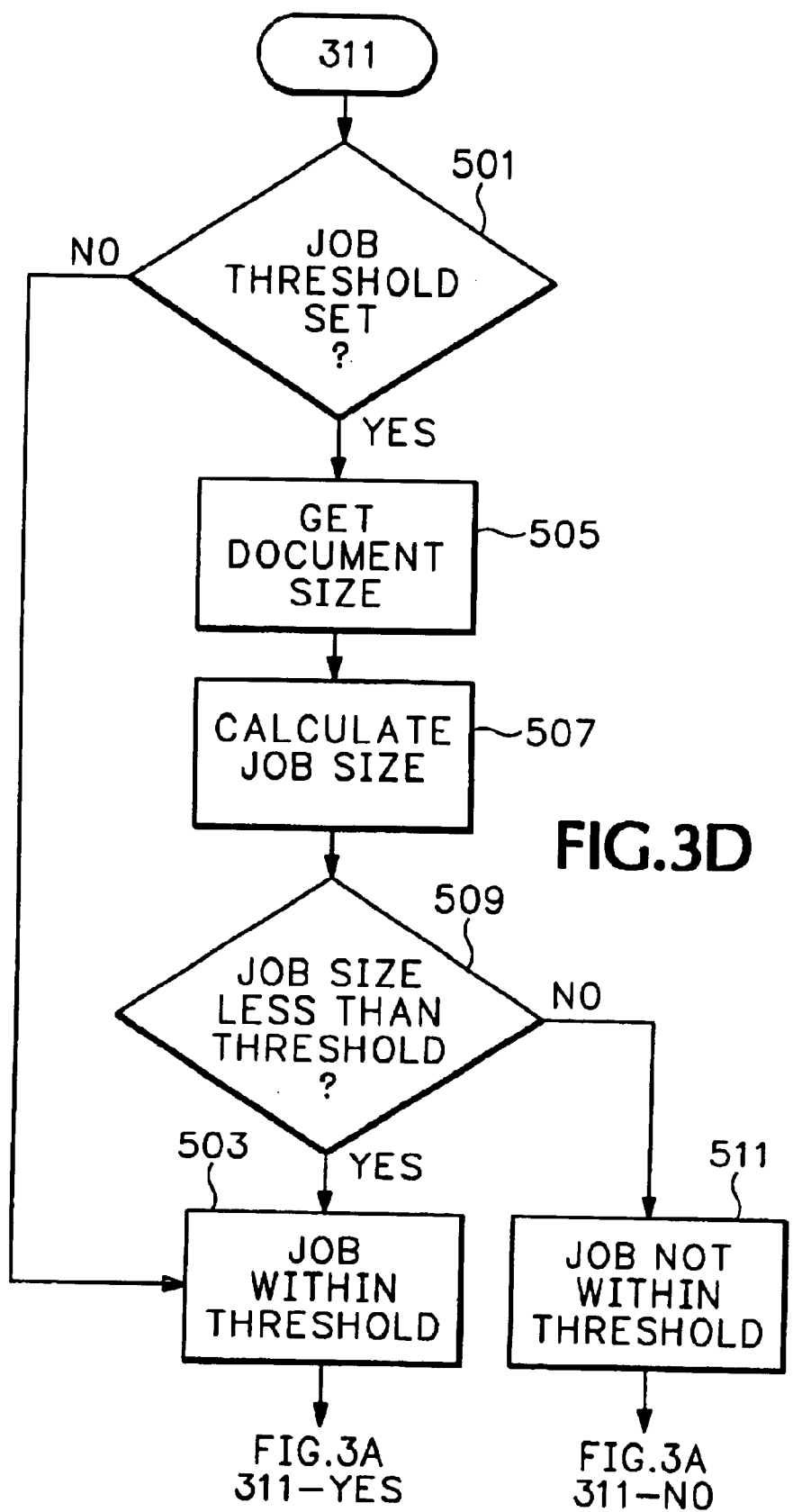

Returning to FIG. 3A, as noted earlier, a transmission may constitute more than one recipient so that the document may by within the threshold, but the "job" may exceed the predetermined job threshold for e-mail, where total transmission data set ("TTDS")=(document size×no. of recipients), where document size and threshold values are in standard units such as bytes Mbytes, Gbytes, etc., as current to the state of the art. Therefore, a second test, step 311, is required if it is determined that the document is within the threshold for direct e-mail transmission, step 305, YES-path. The details of step 311 are shown in FIG. 3D. If the threshold is essentially unlimited, step 501, NO-path, the job is determined as being within the threshold, step 503, and the job is approved, step 311, YES-path, and sent to each recipient via normal e-mail, step 313, FIG. 3A. Assuming there is a predetermined job threshold, step 501, YES-path, the document size is determined, step 505, and the TTDS is calculated, step 507. Next, step 509, a determination is made as to whether the job size is less than the job threshold. If so, step 509, YES-path, the entire job is approved, step 503, and sent via e-mail, step 313, FIG. 3A. The job is essentially done, step 309. If not less than the job threshold, step 509, NO-PATH, the job is so designated, step 511, and rerouted, step 311, NO-path (FIG. 3A) to processing and web site delivery, step 307 (FIGS. 3A and 3C).

Thus, the present invention provides a method 300 and apparatus 200 for determining 305–313 if a data set 303 for transmission can be sent directly via e-mail 313, given predetermined thresholds for sending, or whether it is more expedient to reroute the data set to a web site 307. Every time a user sends document to e-mail, transparently the size of the document/job is compared to the thresholds and the system automatically determines the best available routing, reformatting 401–407 if necessary.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

What is claimed is:

1. A process for transmitting electronic mail messages from an original sender over a computer network, comprising the steps of:
   predetermining a size threshold for transmission of electronic mail messages;
   determining a size of an electronic mail message after the original sender attempts to send said message to an intended recipient but prior to actual transmission of said message from the sender toward the recipient; and
   if said size is less than said threshold, transmitting said electronic mail message from the sender to the intended recipient, and
   if said size is greater than said threshold, transmitting said electronic mail message from the original sender to a separate data storage site instead of to the intended recipient.

2. The process as set forth in claim 1, further comprising:
   predetermining a transmission job set size threshold;
   determining if said electronic mail message is to be transmitted to more than one recipient; and
   if said electronic mail message is to be transmitted to more than one recipient, and if a total transmission data set size is less than said transmission job set size threshold, transmitting said electronic mail message to the intended recipients, or if said electronic mail message is to be transmitted to more than one recipient, and if a total transmission data set size is greater than said transmission job set size threshold, transmitting said electronic mail message via said data storage site.

3. The process as set forth in claim 2, comprising:
   total transmission data set size is determined in accordance with the equation:

total transmission data set ("TTDS")=(document size×no. of recipients).

4. The process as set forth in claim 1, the step of transmitting to said data storage site further comprising:
   generating an HTML Wrapper for said electronic mail message.

5. The process as set forth in claim 4, the step of transmitting to said data storage site further comprising:
   copying said electronic mail message to said data storage site.

6. The process as set forth in claim 5, the step of transmitting to said data storage site further comprising:
   generating a second electronic mail message for sending to an intended recipient of said first electronic mail message, said second electronic mail message including a URL to said data storage site.

7. The process as set forth in claim 6, further comprising:
   in lieu of sending said first electronic mail message to the intended recipient, sending said second electronic mail message to the intended recipient including the URL.

8. A system for transmitting data sets over a network comprising:
   at least one digital sender configured to transmit a data set including an electronic mail message and an electronic mail attachment, said digital sender being coupled to the network, the network having a plurality of computing devices thereon, said computing devices each having electronic mail and computer network navigation tools; and
   means for routing data sets over the network, including means for determining size of a data set to be routed to a predetermined electronic mail destination after an original sender attempts to send said data set but prior to actual transmission of said data set from the sender toward an intended recipient, means for comparing a determined data set size to a threshold, means for rerouting said data set from electronic mail to a data storage site when said determined data set size is greater than said threshold such that said data set is not transmitted as an electronic mail message to a recipient, means for substituting an electronic mail message for an original electronic mail message, said substituted electronic mail message including a link to the data site, and means for sending said substituted electronic mail message to the predetermined electronic mail destination when said determined data set size is greater than said threshold.

9. The system as set forth in claim 8, further comprising:

said network includes the internet, and said computer network navigation tool is an internet browser.

10. The system as set forth in claim 8, said means for routing further comprising:

computer coded instruction sets.

11. The system as set forth in claim 8, said means for determining size of a data set further comprising:

means for calculating a total data set size for sending said data set to a plurality of recipients substantially simultaneously.

12. The system as set forth in claim 11, said means for comparing further comprising:

means for determining if the total data set size for sending said data set to a plurality of recipients substantially simultaneously is greater than said threshold.

13. The system as set forth in claim 8, said means for rerouting including means for rerouting said data set to a web site subsequently accessible by using said network navigational tool.

14. A multifunctional peripheral apparatus for a computer network, comprising:

a document digitizing subsystem for converting a document into a digital data set that can be transmitted as an electronic mail attachment;

connected to said document digitizing subsystem, a sending module for transmitting a data set created with said document digitizing device; and associated with said sending module, a routing subsystem for determining if a data set is to be transmitted via electronic mail or via a data storage unit relative to a determined size of said data set, wherein said routing subsystem determines the size of said data set upon an original sender attempting to send said data set via electronic mail but before said data set is actually transmitted from the sender toward an intended recipient, compares the determined size with a predetermined threshold, and diverts said data set to said data storage unit if the determined size exceeds the predetermined threshold, said data storage unit being at a location separate from a location of the intended recipient.

15. The apparatus as set forth in claim 14, said routing subsystem further comprising:

computer readable program code for reformatting said data set from electronic mail to a format retrievable using a network navigation program.

16. The apparatus as set forth in claim 14, said routing subsystem further comprising:

computer readable program code for reformatting said data set from electronic mail to a format retrievable using a browser, and computer readable program code for generating and transmitting an electronic mail message providing a URL for said browser.

17. The apparatus as set forth in claim 14, further comprising:

a computer adapted for providing said data storage unit accessible via a browser using a hyperlink.

18. A computer memory comprising:

a program for routing data sets over a computer network, including computer readable coded instructions for predetermining a data set size threshold;

computer readable coded instructions for determining a data set size; and computer readable coded instructions for transmitting said data set via electronic mail from an original sender to an intended recipient if said data set size is less than the threshold, and computer readable coded instructions for transmitting said data set from the sender directly to a data storage site instead of the intended recipient if said data set size is greater than the threshold, said instructions for transmitting said data set directly to a data storage site being activated by an attempt by the original sender to send said data set to the intended recipient prior to actual transmission of said data set toward the intended recipient.

19. The memory as set forth in claim 18, further comprising:

computer readable coded instructions for predetermining a transmission job set size threshold;

computer readable coded instructions for determining if said data set is to be transmitted to more than one recipient on said network; and if said data set is to be transmitted to more than one recipient on said network, and if a total transmission data set size is less than said transmission job set size threshold, computer readable coded instructions for transmitting via electronic mail, or if said data set is to be transmitted to more than one recipient on said network, and if a total transmission data set size is greater less than said transmission job set size threshold, computer readable coded instructions for transmitting via said data storage site.

20. The memory as set forth in claim 19, said computer readable coded instructions for transmitting via said data storage site further comprising:

computer readable coded instructions for generating an HTML Wrapper for said document, computer readable coded instructions for copying the document to said data storage site, computer readable coded instructions for generating an electronic mail message for sending via electronic mail to an intended recipient of said data set, said electronic mail message including a URL to said data storage site, and computer readable coded instructions for sending said electronic mail message including the URL in lieu of sending said data set to the intended recipient.

* * * * *